US012418111B2

(12) United States Patent
Lin et al.

(10) Patent No.: US 12,418,111 B2

(45) Date of Patent: Sep. 16, 2025

(54) ANTENNA STRUCTURE

(71) Applicant: Quanta Computer Inc., Taoyuan (TW)

(72) Inventors: Chun-I Lin, Taoyuan (TW); Bo-Wei Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 153 days.

(21) Appl. No.: 18/500,384

(22) Filed: Nov. 2, 2023

(65) Prior Publication Data

US 2025/0112363 A1 Apr. 3, 2025

(30) Foreign Application Priority Data

Sep. 28, 2023 (TW) ................................ 112137402

(51) Int. Cl.
*H01Q 5/307* (2015.01)
*H01Q 1/48* (2006.01)
*H01Q 9/04* (2006.01)

(52) U.S. Cl.
CPC ............... *H01Q 5/307* (2015.01); *H01Q 1/48* (2013.01); *H01Q 9/0421* (2013.01)

(58) Field of Classification Search
CPC .......... H01Q 1/48; H01Q 5/307; H01Q 5/371; H01Q 5/378; H01Q 9/0421; H01Q 9/42
See application file for complete search history.

(56) References Cited

U.S. PATENT DOCUMENTS 7,450,072 B2 * 11/2008 Kim ....................... H01Q 1/243 343/846
9,406,998 B2 * 8/2016 Korva ................... H01Q 21/30
10,522,902 B1 * 12/2019 Tseng ....................... H01Q 1/48
11,862,838 B2 * 1/2024 Zhang .................... H01Q 5/378
2005/0168384 A1 * 8/2005 Wang ....................... H01Q 9/42 343/702

(Continued)

FOREIGN PATENT DOCUMENTS

| | | | |
|---|---|---|---|
| TW | 200525818 A | 8/2005 | |
| TW | I261952 B * | 9/2006 | ........... H01Q 13/085 |

OTHER PUBLICATIONS

Chinese language office action dated Oct. 15, 2024, issued in application No. TW 112137402.

*Primary Examiner* — Sean Kayes

(74) *Attorney, Agent, or Firm* — McClure, Qualey & Rodack, LLP

(57) ABSTRACT

An antenna structure includes a main ground element, an extension ground element, a feeding radiation element, a first radiation element, a second radiation element, a shorting radiation element, a third radiation element, and a dielectric substrate. The extension ground element is coupled to the main ground element. A notch region is defined by the main ground element and the extension ground element. The feeding radiation element has a feeding point. The first radiation element is coupled to the feeding radiation element. The second radiation element is coupled to the feeding radiation element. The second radiation element and the first radiation element substantially extend in opposite directions. The feeding radiation element is also coupled through the shorting radiation element to the extension ground element. The third radiation element is coupled to the main ground element.

9 Claims, 4 Drawing Sheets

(56) References Cited

U.S. PATENT DOCUMENTS

| | | | | |
|---|---|---|---|---|
| 2013/0050057 | A1* | 2/2013 | Hayashi | H01Q 1/38<br>343/893 |
| 2020/0106178 | A1* | 4/2020 | Chou | H01Q 1/2291 |
| 2023/0231310 | A1* | 7/2023 | Zhang | H01Q 9/045<br>343/848 |

* cited by examiner

ANTENNA STRUCTURE

CROSS REFERENCE TO RELATED APPLICATIONS

This application claims priority of Taiwan Patent Application No. 112137402 filed on Sep. 28, 2023, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHZ, 1800 MHZ, 1900 MHZ, 2100 MHZ, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may affect the communication quality of the mobile device in which it is installed. Accordingly, it has become a critical challenge for antenna designers to design a small-size, wideband antenna structure.

BRIEF SUMMARY OF THE INVENTION

In an exemplary embodiment, the invention is directed to an antenna structure that includes a main ground element, an extension ground element, a feeding radiation element, a first radiation element, a second radiation element, a shorting radiation element, a third radiation element, and a dielectric substrate. The extension ground element is coupled to the main ground element. A notch region is defined by the main ground element and the extension ground element. The feeding radiation element has a feeding point. The first radiation element is coupled to the feeding radiation element. The second radiation element is coupled to the feeding radiation element. The second radiation element and the first radiation element substantially extend in opposite directions. The feeding radiation element is also coupled through the shorting radiation element to the extension ground element. The third radiation element is coupled to the main ground element. The main ground element, the extension ground element, the feeding radiation element, the first radiation element, the second radiation element, the shorting radiation element, and the third radiation element are all disposed on the dielectric substrate.

In some embodiments, the extension ground element further includes a protruding portion. The protruding portion is adjacent to the notch region, and also extends toward the third radiation element.

In some embodiments, the notch region substantially has a rectangular shape.

In some embodiments, the sum of the length and the width of the notch region is from 7 mm to 12 mm.

In some embodiments, the combination of the feeding radiation element, the first radiation element, and the second radiation element substantially has a T-shape.

In some embodiments, the third radiation element substantially has an L-shape.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the total length of the feeding radiation element and the first radiation element is shorter than or equal to 0.25 wavelength of the first frequency band.

In some embodiments, the total length of the feeding radiation element and the second radiation element is from 0.125 to 0.25 wavelength of the second frequency band.

In some embodiments, the length of the third radiation element is from 0.125 to 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
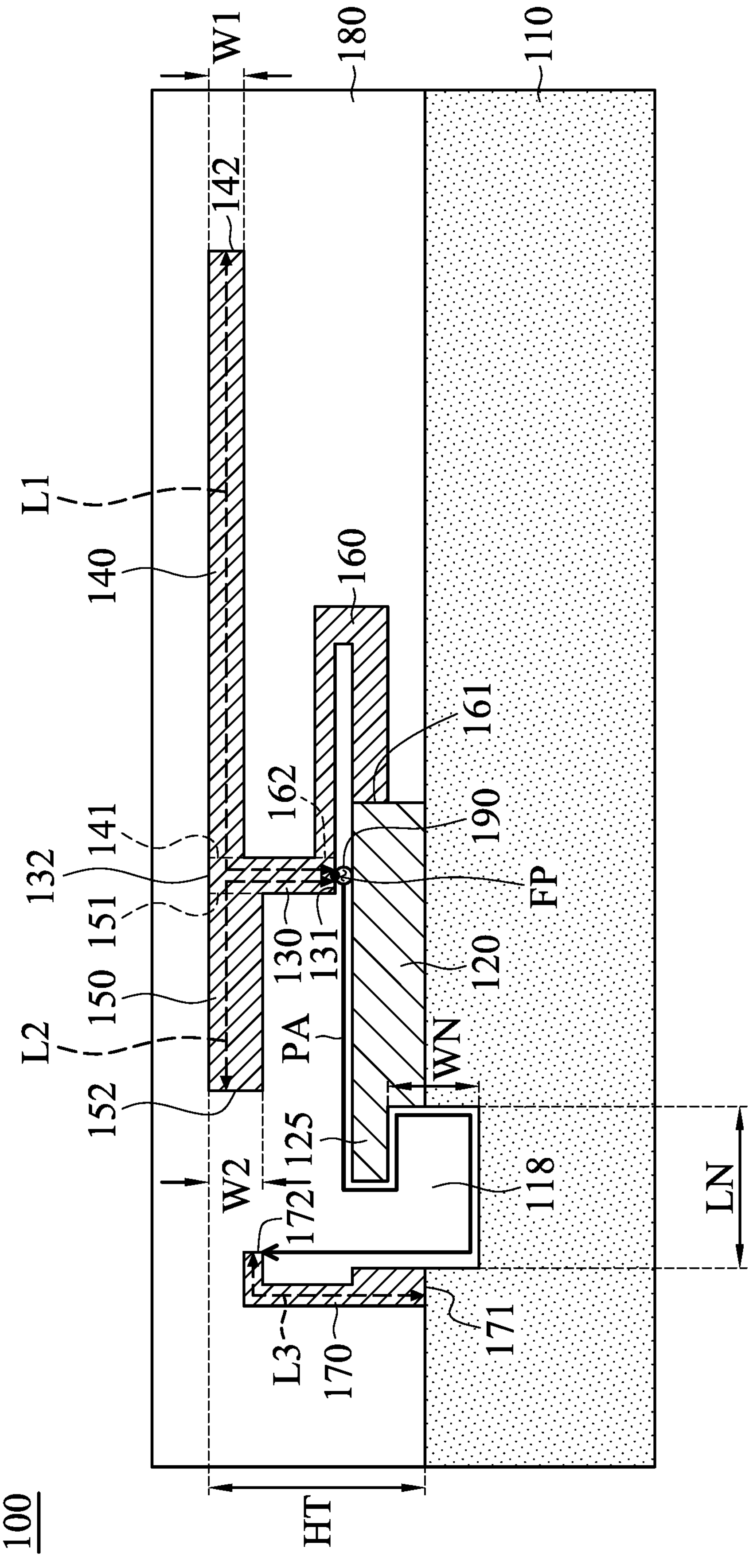
FIG. 1 is a diagram of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. For example, the antenna structure 100 may be used in a mobile device, such as a smart phone, a tablet computer, a notebook computer, a wireless access point, a router, or any device with a communication function. Alternatively, the antenna structure 100 may be applied to an electronic device, such as any unit of IoT (Internet of Things).

As shown in FIG. 1, the antenna structure 100 includes a main ground element 110, an extension ground element 120, a feeding radiation element 130, a first radiation element 140, a second radiation element 150, a shorting radiation element 160, a third radiation element 170, and a dielectric substrate 180. The main ground element 110, the extension ground element 120, the feeding radiation element 130, the first radiation element 140, the second radiation element 150, the shorting radiation element 160, and the third radiation element 170 may all be made of metal materials, such as copper, silver, aluminum, iron, or an alloy thereof.

The shapes of the main ground element 110 and the extension ground element 120 are not limited in the invention. The main ground element 110 may be considered as a system ground plane of the antenna structure 100. The extension ground element 120 may be implemented with a ground copper foil. For example, an integrated molding design may be formed by the main ground element 110 and the extension ground element 120, but it is not limited thereto. The extension ground element 120 is coupled to the main ground element 110. A notch region 118 is defined by the main ground element 110 and the extension ground element 120. In some embodiments, the extension ground element 120 further includes a protruding portion 125. The protruding portion 125 of the extension ground element 120 is adjacent to the notch region 118, and also extends toward the third radiation element 170. In alternative embodiments, the aforementioned protruding portion 125 is removed from the extension ground element 120. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

For example, the notch region 118 may substantially have a rectangular shape. However, the invention is not limited thereto. In alternative embodiments, the notch region 118 substantially has a square shape, a semi-circular shape, a trapezoidal shape, or an irregular shape. Also, the sum of the length LN and the width WN of the notch region 118 (i.e., LN+WN) can be substantially equal to a constant value. That is, if the length LN of the notch region 118 becomes shorter, the width WN of the notch region 118 will become longer. Conversely, if the length LN of the notch region 118 becomes longer, the width WN of the notch region 118 will become shorter. It should be understood that there is no metal element disposed inside the notch region 118.

The feeding radiation element 130 may substantially have a straight-line shape. Specifically, the feeding radiation element 130 has a first end 131 and a second end 132. A feeding point FP is positioned at the first end 131 of the feeding radiation element 130. The feeding point FP may be further coupled to a signal source 190. For example, the signal source 190 may be an RF (Radio Frequency) module for exciting the antenna structure 100. In some embodiments, a positive electrode of the signal source 190 is coupled to the feeding point FP, and a negative electrode of the signal source 190 is coupled to the extension ground element 120.

The first radiation element 140 may substantially have a relatively long straight-line shape, which may be substantially perpendicular to the feeding radiation element 130. Specifically, the first radiation element 140 has a first end 141 and a second end 142. The first end 141 of the first radiation element 140 is coupled to the second end 132 of the feeding radiation element 130. The second end 142 of the first radiation element 140 is an open end.

The second radiation element 150 may substantially have a relatively short straight-line shape, which may be substantially perpendicular to the feeding radiation element 130. The width W2 of the second radiation element 150 may be greater than the width W1 of the first radiation element 140. Specifically, the second radiation element 150 has a first end 151 and a second end 150. The first end 151 of the second radiation element 150 is coupled to the second end 132 of the feeding radiation element 132. The second end 152 of the second radiation element 150 is an open end. For example, the second end 152 of the second radiation element 150 and the second end 142 of the first radiation element 140 may substantially extend in opposite directions. In some embodiments, the combination of the feeding radiation element 130, the first radiation element 140, and the second radiation element 150 substantially has a T-shape.

The shorting radiation element 160 may substantially have a U-shape. Specifically, the shorting radiation element 160 has a first end 161 and a second end 162. The first end 161 of the shorting radiation element 160 is coupled to the extension ground element 120. The second end 162 of the shorting radiation element 160 is coupled to the first end 131 of the feeding radiation element 130. That is, the feeding radiation element 130 is further coupled through the shorting radiation element 160 to the extension ground element 120.

The third radiation element 170 may substantially have a variable-width L-shape. Specifically, the third radiation element 170 has a first end 171 and a second end 172. The first end 171 of the third radiation element 170 is coupled to the main ground element 110. The second end 172 of the third radiation element 170 is an open end. The first end 171 of the third radiation element 170 is disposed adjacent to the notch region 118. In addition, the second end 172 of the third radiation element 170 extends toward the second end 152 of the second radiation element 150. However, the invention is not limited thereto. In alternative embodiments, the third radiation element 170 substantially has an equal-width L-shape.

For example, the dielectric substrate 180 may be an FR4 (Flame Retardant 4) substrate, a PCB (Printed Circuit Board), or an FPC (Flexible Printed Circuit). The main ground element 110, the extension ground element 120, the feeding radiation element 130, the first radiation element 140, the second radiation element 150, the shorting radiation element 160, and the third radiation element 170 are all disposed on the same surface of the dielectric substrate 180. In some embodiments, the antenna structure 100 is a planar antenna structure. However, the invention is not limited thereto. In alternative embodiments, the antenna structure 100 is modified to a 3D (Three-Dimensional) antenna structure, without affecting its radiation performance.

Figure 2:
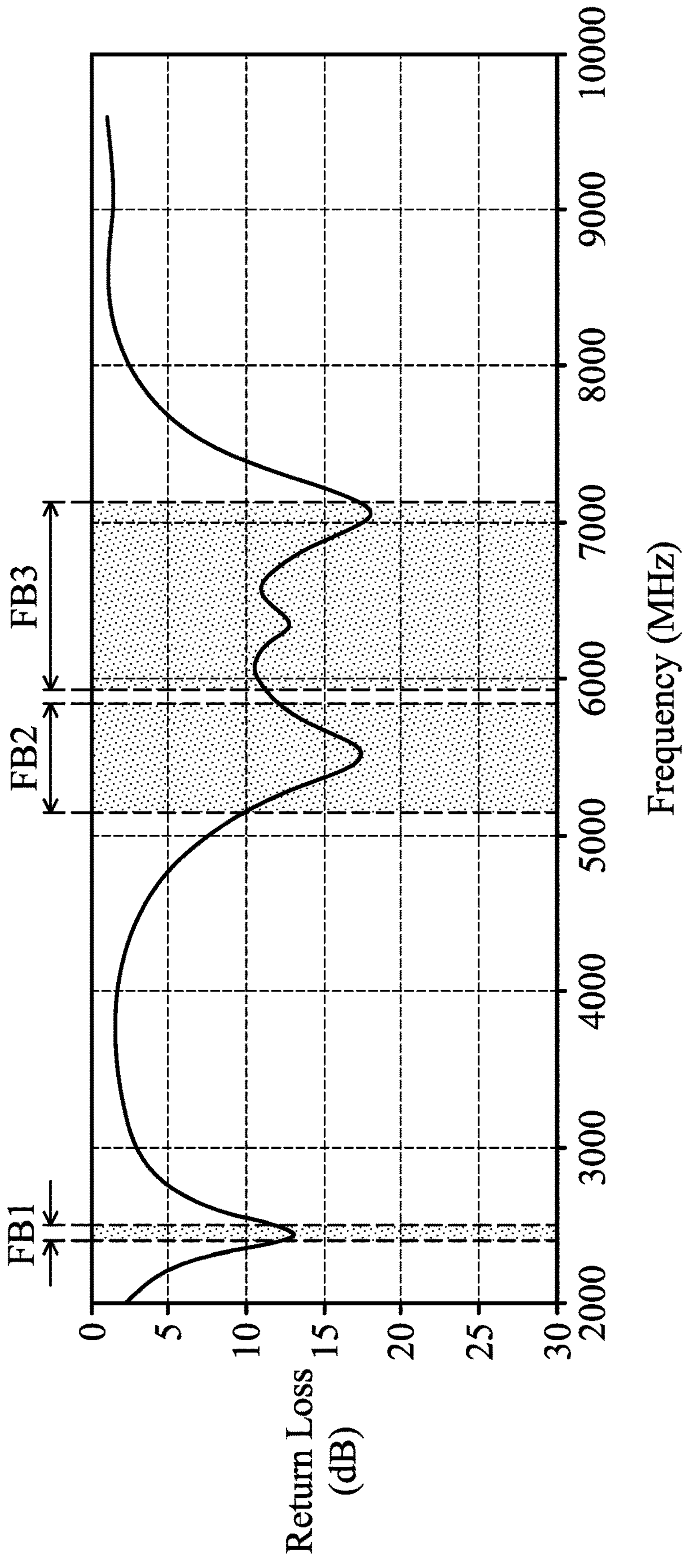
FIG. 2 is a diagram of the return loss of an antenna structure according to an embodiment of the invention.

FIG. 2 is a diagram of the return loss of the antenna structure 100 according to an embodiment of the invention. The horizontal axis represents the operational frequency (MHz), and the vertical axis represents the return loss (dB). According to the measurement in FIG. 2, the antenna structure 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the antenna structure 100 can support at least the wideband operations of the WLAN (Wireless Local Area Network) and Wi-Fi 6E.

In some embodiments, the operational principles of the antenna structure 100 will be described as follows. The feeding radiation element 130 and the first radiation element 140 can be excited to generate the first frequency band FB1. The feeding radiation element 130 and the second radiation element 150 can be excited to generate the second frequency band FB2. In addition, a current path PA may be formed from the feeding point FP, along the extension ground element 120, the main ground element 110, and the notch region 118 thereof, to the second end 172 of the third radiation element 170. Thus, the third radiation element 170 can be excited to generate the third frequency band FB3. It should be noted that the incorporation of the notch region 118 can increase the effective length of the current path PA. According to practical measurements, such a design can fine-tune the impedance matching of the third frequency band FB3, thereby decreasing the central frequency of the third frequency band FB3. Therefore, the antenna structure 100 of the invention can fully support the desired wideband operations without additionally increasing its overall size.

Figure 3:
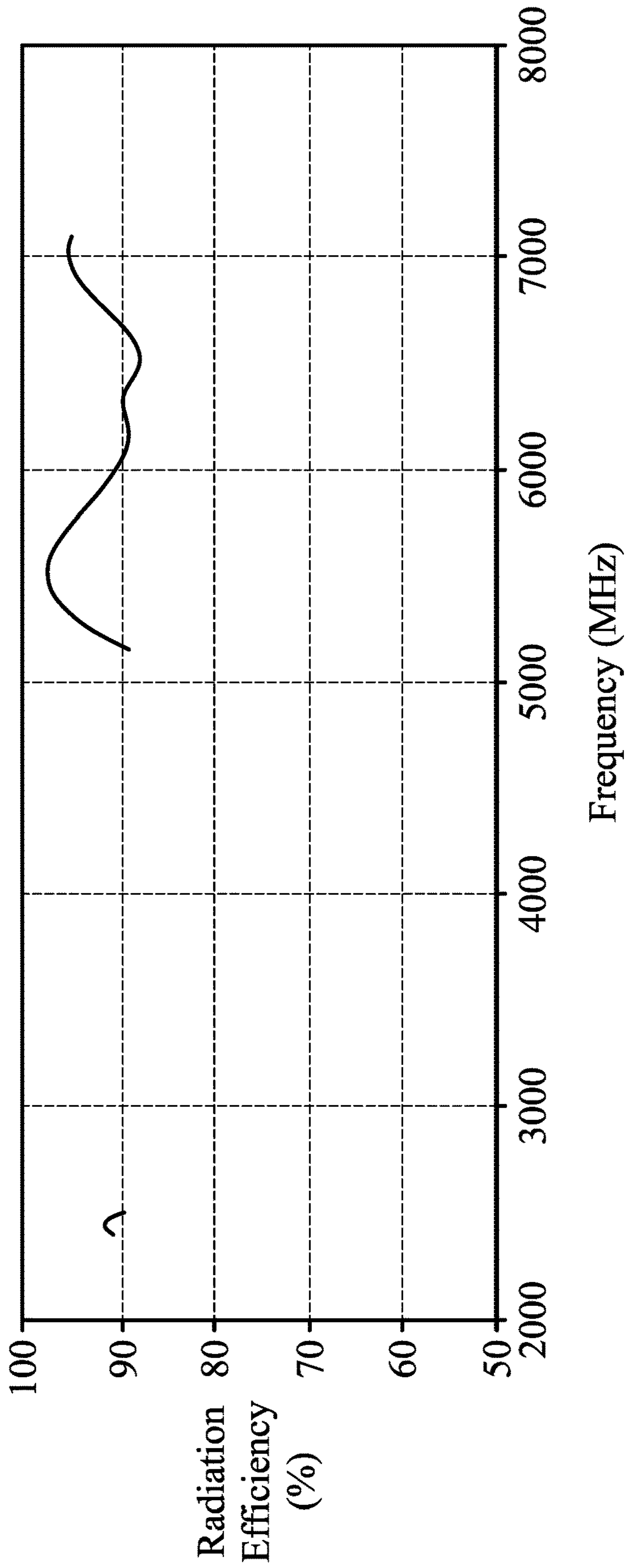
FIG. 3 is a diagram of radiation efficiency of an antenna structure according to an embodiment of the invention.

FIG. 3 is a diagram of radiation efficiency of the antenna structure 100 according to an embodiment of the invention. The horizontal axis represents the operational frequency (MHz), and the vertical axis represents the radiation efficiency (%). According to the measurement in FIG. 3, the radiation efficiency of the antenna structure 100 can reach at least 90% within the first frequency band FB1, the second frequency band FB2, and the third frequency band FB3 as mentioned above. It can meet the requirements of practical application of general mobile communication devices.

In some embodiments, the element sizes of the antenna structure 100 will be described as follows. The sum of the length LN and the width WN of the notch region 118 may be from 7 mm to 12 mm. The total length L1 of the feeding radiation element 130 and the first radiation element 140 may be shorter than or equal to 0.25 wavelength (λ/4) of the first frequency band FB1 of the antenna structure 100. The total length L2 of the feeding radiation element 130 and the second radiation element 150 may be from 0.125 to 0.25 wavelength (λ/8~λ/4) of the second frequency band FB2 of the antenna structure 100. The length L3 of the third radiation element 170 may be from 0.125 to 0.25 wavelength (λ/8~λ/4) of the third frequency band FB3 of the antenna structure 100. The width W1 of the first radiation element 140 may be from 1 mm to 1.5 mm. The width W2 of the second radiation element 150 may be from 1.5 mm to 2 mm. Also, the first radiation element 140 or the second radiation element 150 has a height HT on the main ground element 110, and the height HT may be shorter than or equal to 5 mm. The above ranges of element sizes are calculated and obtained according to many experiment results, and they help to optimize the operational bandwidth and impedance matching of the antenna structure 100.

Figure 4:
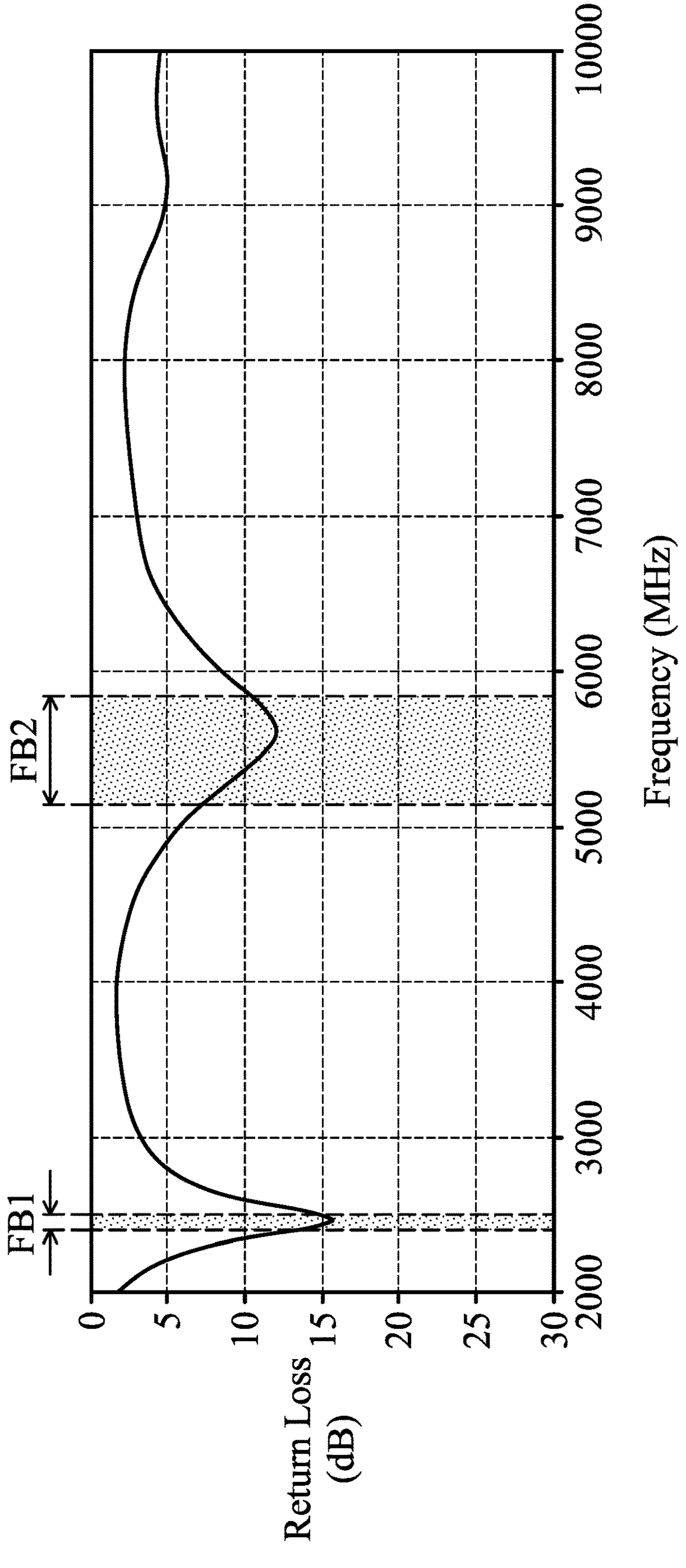
FIG. 4 is a diagram of the return loss of an antenna structure according to another embodiment of the invention.

FIG. 4 is a diagram of the return loss of the antenna structure 100 according to another embodiment of the invention. The horizontal axis represents the operational frequency (MHz), and the vertical axis represents the return loss (dB). It should be understood that if the aforementioned notch region 118 is filled with a metal material and each of the main ground element 110 and the extension ground element 120 has a complete shape, the operational characteristics of the antenna structure 100 will be modified to those described in the embodiment of FIG. 4. According to the measurement in FIG. 4, although the first frequency band FB1 and the second frequency band FB2 of the antenna structure 100 are almost unchanged, the central frequency of the third frequency band FB3 of the antenna structure 100 may be significantly increased to 9 GHz. In other words, the incorporation of the aforementioned notch region 118 can help the proposed antenna structure 100 of the invention to cover the whole desired third frequency band FB3.

The invention proposes a novel antenna structure. In comparison to the conventional design, the invention has at least the advantages of small size, wide bandwidth, and low manufacturing cost. Therefore, the invention is suitable for application in a variety of mobile communication devices or IOT (especially for the devices with narrow borders).

Note that the above element sizes, element shapes, and frequency ranges are not limitations of the invention. An antenna designer can fine-tune these settings or values, depending on requirements. It should be understood that the antenna structure of the invention is not limited to the configurations of FIGS. 1-4. The invention may merely include any one or more features of any one or more embodiments of FIGS. 1-4. In other words, not all of the features displayed in the figures should be implemented in the antenna structure of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a main ground element;

an extension ground element, coupled to the main ground element, wherein a notch region is defined by the main ground element and the extension ground element;

a feeding radiation element, having a feeding point;

a first radiation element, coupled to the feeding radiation element;

a second radiation element, coupled to the feeding radiation element, wherein the second radiation element and the first radiation element substantially extend in opposite directions;

a shorting radiation element, wherein the feeding radiation element is coupled through the shorting radiation element to the extension ground element;

a third radiation element, coupled to the main ground element; and a dielectric substrate, wherein the main ground element, the extension ground element, the feeding radiation element, the first radiation element, the second radiation element, the shorting radiation element, and the third radiation element are disposed on the dielectric substrate;

wherein the extension ground element further comprises a protruding portion, and the protruding portion is adjacent to the notch region and extends toward the third radiation element.

2. The antenna structure as claimed in claim 1, wherein the notch region substantially has a rectangular shape.

3. The antenna structure as claimed in claim 1, wherein a sum of a length and a width of the notch region is from 7 mm to 12 mm.

4. The antenna structure as claimed in claim 1, wherein a combination of the feeding radiation element, the first radiation element, and the second radiation element substantially has a T-shape.

5. The antenna structure as claimed in claim 1, wherein the third radiation element substantially has an L-shape.

6. The antenna structure as claimed in claim 1, wherein the antenna structure covers a first frequency band, a second frequency band, and a third frequency band, the first frequency band is from 2400 MHz to 2500 MHz, the second frequency band is from 5150 MHz to 5850 MHz, and the third frequency band is from 5925 MHz to 7125 MHz.

7. The antenna structure as claimed in claim 6, wherein a total length of the feeding radiation element and the first radiation element is shorter than or equal to 0.25 wavelength of the first frequency band.

8. The antenna structure as claimed in claim 6, wherein a total length of the feeding radiation element and the second radiation element is from 0.125 to 0.25 wavelength of the second frequency band.

9. The antenna structure as claimed in claim 6, wherein a length of the third radiation element is from 0.125 to 0.25 wavelength of the third frequency band.

* * * * *